Patented Oct. 27, 1942

2,299,759

UNITED STATES PATENT OFFICE 2,299,759

SAPOGENIN REDUCTION PRODUCT AND PREPARATION OF SAME

Russell Earl Marker, State College, Pa., assignor to Parke, Davis & Company, Detroit, Mich., a corporation of Michigan No Drawing. Application February 17, 1941, Serial No. 379,359

15 Claims. (Cl. 260—397.2)

This invention relates to sapogenin derivatives and preparation of the same, and more particularly to the preparation of new sapogenin derivatives having a reduced side chain.

The steroidal sapogenins have, in general, the formula $C_{27}H_{42-4}O_{3-5}$, of which the portion $C_8H_{16}O_2$ is known to be present as a side chain attached to ring D of the steroid skeleton. Tschesche and Hagedorn (Ber. 68, 2247 (1935)) proposed the formula

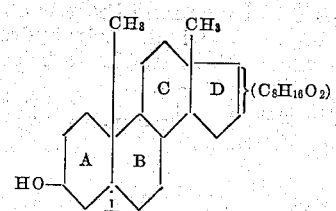

or

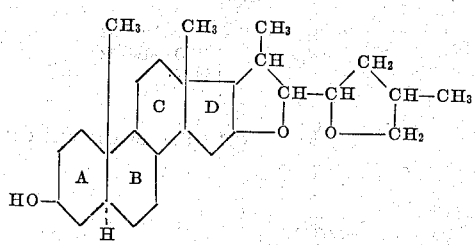

for the sapogenin, tigogenin, and later workers have, with reservations, accepted this formulation of the steroidal sapogenin side chain. Other sapogenins such as digitogenin, gitogenin, chlorogenin, diosgenin, and sarsasapogenin have been shown to differ from tigogenin only in regard to the connections between ring A and B, the degree of saturation of the ring system, and the number of substituents attached to these rings. These differences are shown below:

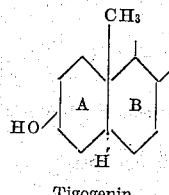
Tigogenin

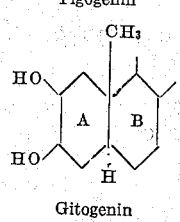
Gitogenin

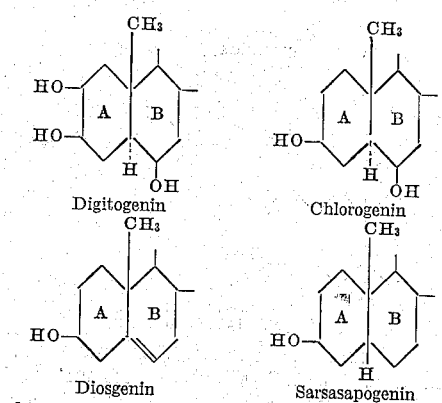
Digitogenin
Chlorogenin
Diosgenin
Sarsasapogenin

I have recently suggested (Marker & Rohrmann, J. Am. Chem. Soc. 61, 846 (1939)) that a more likely structure for the side chain of these steroidal sapogenins is that shown below.

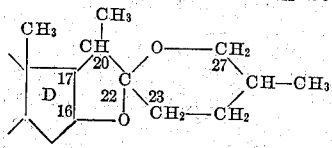

It is apparent that this formulation differs from that of Tschesche and Hagedorn in that the linkage, $C_{27}-O-$, is transferred from $C_{23}$ to $C_{22}$. However, a profound difference in the nature of the functional character of the side chain oxygen atoms is implied, for while the Tschesche-Hagedorn formula is that of an $\alpha,\alpha'$-di-tetrahydrofuryl derivative, the Marker-Rohrmann formula is that of a spiro-ketal.

Recently it has been found (Marker & Rohrmann, J. Am. Chem. Soc. 61, 846, 1516, 2724, 3479 (1939); 62, 647, 896, 1162) that the side chain of the naturally occurring sapogenins exists in two modifications. Sarsasapogenin contains one type of side chain characterized by the fact that a sapogenin of this type is readily reduced according to the Clemmensen procedure using alcoholic hydrochloric acid and amalgamated zinc (Marker & Rohrmann, J. Am. Chem. Soc. 61, 846 (1939) to give tetrahydro derivatives in which the side chain has four more hydrogen atoms than in the sapogenins themselves. Tigogenin, gitogenin, digitogenin, and chlorogenin behave differently from sarsasapogenin in that they are not reduced by the Clemmensen procedure, that is to say, they are recovered unchanged after boiling with alcoholic hydrochloric acid and amalgamated zinc. Isosarsasapogenin is converted under the conditions of the Clemmensen reduction to the same tetrahydrosarsasapogenin that sarsasapogenin itself yields. These facts, and others which are cited in the references listed, appear to me to be best explained by assuming that the two types of steroidal sapogenin side chains differ in regard to optical isomerism about $C_{22}$. Accordingly, when it is necessary to distinguish between isomers about $C_{22}$ I represent the two types of side chains by formulae of the following type:

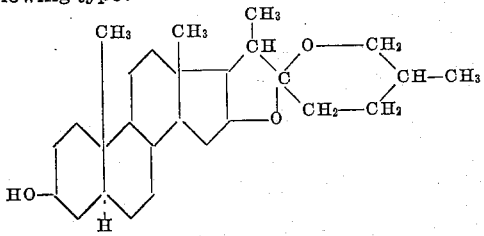

Sarsasapogenin
("Sarsasapogenin type" side chain)

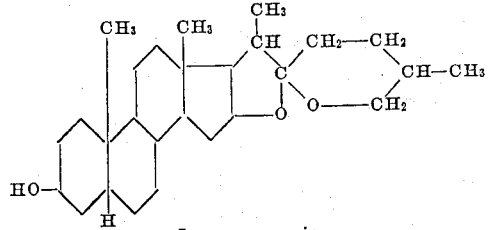

Isosarsasapogenin
("Tigogenin type" side chain)

See especially Marker & Rohrmann, J. Am. Chem. Soc. 62, 896 (1940). Ordinarily where isomerism about $C_{22}$ is not of importance, the formula for the sarsasapogenin type of side chain will be used for configurations both of sarsasapogenin and tigogenin type.

These two types of sapogenin side chains appear to be subject to an equilibrium, the velocity of attainment of which is catalyzed by acidic reagents. The equilibrium is influenced by the configuration of the hydrogen atom at $C_5$, and it appears that the following rule holds true. For compounds of the allo series (cholestane type) the tigogenin type of side chain is the more stable, while for compounds of the regular series (coprostane type) at $C_5$ the sarsasapogenin side chain is the more stable.

For the purpose of greater clarification, the Marker-Rohrmann formulation of the side chain of the steroidal sapogenins will be used in describing the invention. It is to be understood, however, that the processes and products of the present invention may be obtained by the use of the methods herein to be described and these processes and products are claimed without any implications that the reactions and structures involved will ultimately be proved to be as represented herein.

Now I have found that $\Delta^5$-unsaturated sapogenins and their side chain halogenated derivatives can be treated with mineral acid and zinc, under conditions more vigorous than those required merely to reduce a 3-keto group, to form new $\Delta^5$-unsaturated sapogenin derivatives with altered side chain. These substances may also be called $\Delta^5$-unsaturated tetrahydrosapogenins.

The $\Delta^5$-unsaturated tetrahydrosapogenins are readily transformed in rings A and B to yield other tetrahydrosapogenins, especially those of the allo series which have been hitherto inaccessible.

For example, the triacetate of tetrahydrodiosgenin may be oxidized with chromic anhydride in acetic acid at 45° C. to yield the new 7-keto-tetrahydrodiosgenin triacetate. This may be reduced with aluminum isopropylate and isopropyl alcohol to yield after hydrolysis and then benzoylation, the tetrabenzoate of 7-hydroxy-tetrahydrodiosgenin. On refluxing this tetrabenzoate with dimethylaniline there is obtained the tribenzoate of 7-dehydro-tetrahydrodiosgenin. These transformations are shown below.

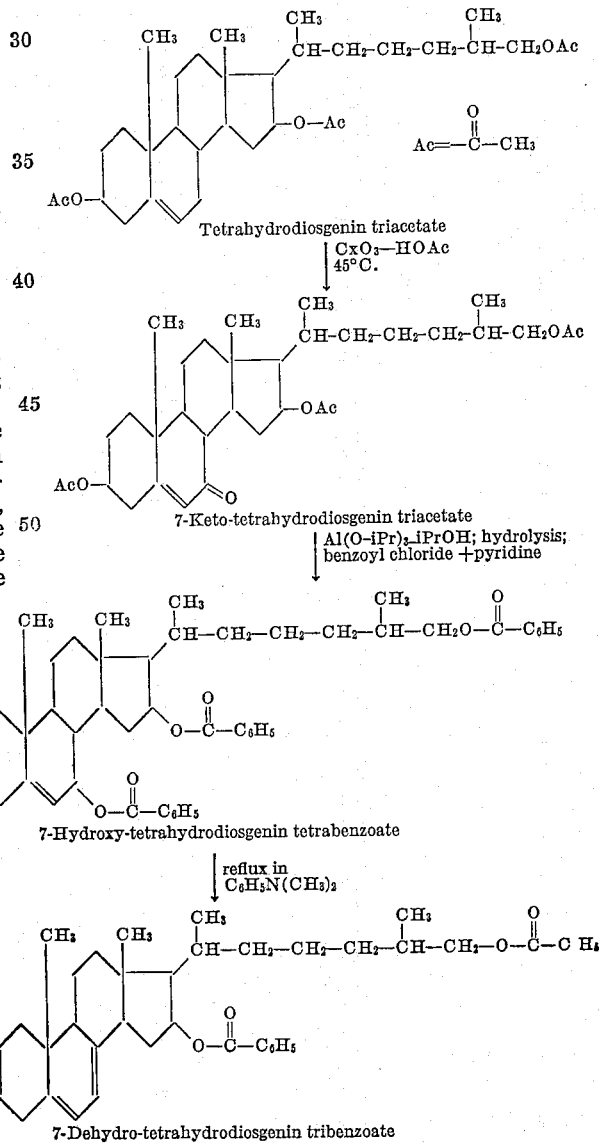

Alternatively, the triacetate of 7-keto tetrahydrodiosgenin may be reduced with sodium in alcohol to give 7-hydroxy-tetrahydrotigogenin:

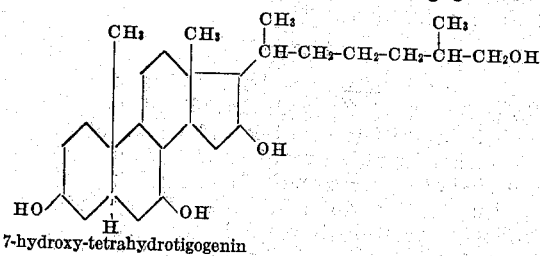
7-hydroxy-tetrahydrotigogenin

Another example of new tetrahydrosapogenin derivatives made possible by this invention is as follows:

Tetrahydrodiosgenyl chloride is hydrogenated in acetic acid solution in the presence of a platinum oxide catalyst to yield tetrahydrotigogenyl chloride as shown below:

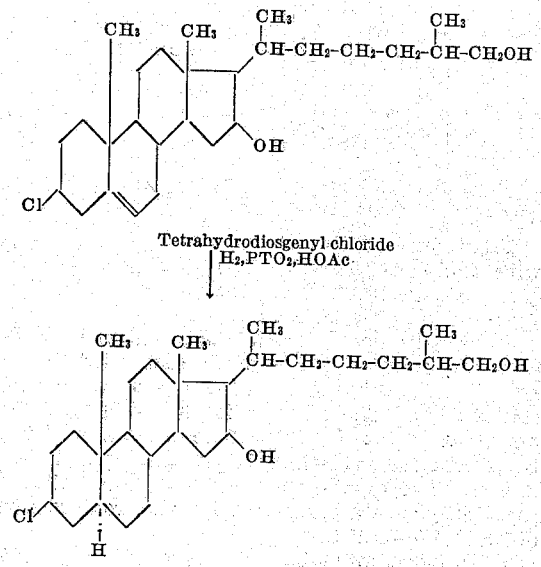

On refluxing the latter with quinoline there is obtained the compound of the following formula:

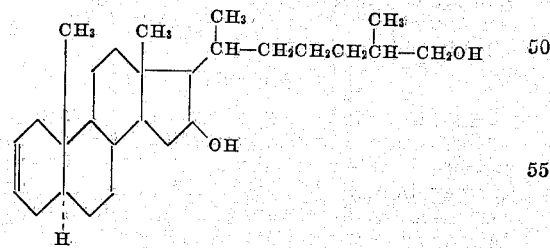

and this may be warmed on the steam bath with hydrogen peroxide in acetic acid to obtain 2-hydroxy-tetrahydrotigogenin.

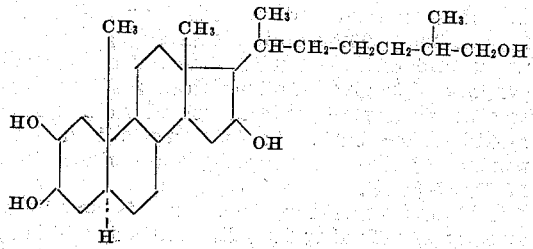
2-hydroxy-tetrahydrotigogenin

Again tetrahydro-$\Delta^4$-tigogenenone can be treated with bromine in acetic acid to obtain the corresponding 6-bromosubstitution product. On refluxing this with methanolic hydrochloric acid there is obtained tetrahydrochlorogenone representable by the following formula

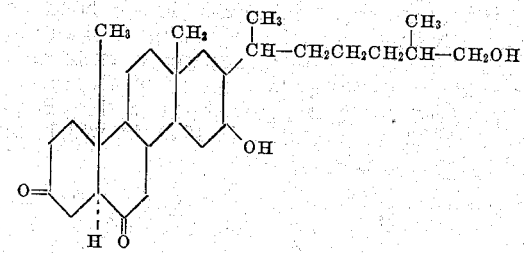

It will be appreciated in view of the foregoing discussion and the examples to follow that I have made available for the first time tetrahydrosapogenin compounds which bear unsaturation about $C_5$ or which have the cholestane configuration at $C_5$. Thus my invention comprehends tetrahydrosapogenin compounds selected from the class consisting of tetrahydrosapogenins having the cholestane conguration at $C_5$, tetrahydrosapogenin derivatives hydrolyzable to tetrahydrosapogenins having the cholestane configuration at $C_5$, tetrahydrosapogenins having a double bond between $C_5$ and one of $C_4$ and $C_6$, and tetrahydrosapogenin derivatives hydrolyzable to tetrahydrosapogenins having a double bond between $C_5$ and one of $C_4$ and $C_6$, said tetrahydrosapogenin compounds bearing in rings A and B together not more than three functional groups selected from the class consisting of double bonds, hydroxyl groups, groups hydrolyzable to hydroxyl groups, ketone groups and groups hydrolyzable to ketone groups.

These new sapogenin derivatives bear an altered side chain which differs from the side chain of the sapogenins themselves by the presence of four more hydrogen atoms.

The new tetrahydrosapogenins of my invention show certain characteristic reactions which distinguish them from the sapogenins themselves. Thus:

(a) Whereas the sapogenins are readily halogenated in the side chain, for example, by treatment with bromine in acetic acid, the tetrahydrosapogenins of the present invention show no tendency to halogenate in the side chain under comparable conditions;

(b) Whereas the sapogenins may be hydrogenated under acidic conditions, in the side chain to give dihydrosapogenins, the tetrahydrosapogenins of the present invention show no tendency to add hydrogen to the side chain;

(c) Whereas the sapogenins are readily oxidized in the side chain by selenium dioxide with the formation of a red precipitate of metallic selenium (for example when the sapogenins are heated for a while with selenium dioxide in a mixture of acetic acid and benzene), the tetrahydrosapogenins of the present invention are unaffected in the side chain by treatment with selenium dioxide under comparable conditions;

(d) Whereas in the side chain of the sapogenins both of the oxygen atoms appear to be inert to the ordinary reagents used to determine the presence of hydroxyl, carboxyl or ketone groups, the tetrahydrosapogenins of the present invention contain in the side chain two reactive oxygen atoms present as hydroxyl groups—a secondary hydroxyl group and a primary hydroxyl group—characterized by their ability to be esterified, etherified and replaced by halogen on treatment with reagents customarily used for this purpose.

The new tetrahydrosapogenin compounds of the present invention, namely, tetrahydrosapogenin compounds of the allo series at $C_5$ (cholestane type) or containing a double bond between $C_5$ and one of $C_4$ and $C_6$ are in many regards similar to the tetrahydrosapogenin compounds having a coprostane configuration at $C_5$, as set forth in my copending application, Serial No. 351,148, filed August 3, 1940, in which the following structure was shown:

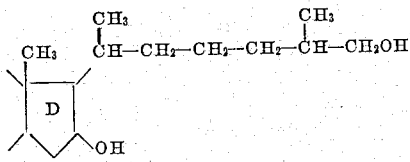

for the side chain attached to ring D in these compounds. The tetrahydrosapogenins having the coprostane configuration at $C_5$ appear to contain only one reactive oxygen atom and this oxygen atom appears to be present as a primary hydroxyl group. The new tetrahydrosapogenins of the present invention appear to contain the same type of side chain as that assigned to the tetrahydrosapogenins having the coprostane configuration at $C_5$. However, the new tetrahydrosapogenins of the present invention contain two reactive oxygen atoms—one present as a secondary, the other as a primary hydroxyl group.

Another distinction between the known tetrahydrosapogenins and the new tetrahydrosapogenins of the present invention exists in how they may be prepared. The former are all readily prepared by treatment of steroidal sapogenins having the coprostane configuration at $C_5$ with alcoholic hydrochloric acid and amalgamated zinc. The new tetrahydrosapogenin compounds of the present invention cannot all be prepared in this manner. The new tetrahydrosapogenins having a double bond at $C_5$ can be prepared by the action of mineral acid and zinc on $\Delta^5$-unsaturated steroidal sapogenins, but tetrahydrosapogenins having the cholestane configuration cannot be prepared in this manner. This latter group has now become available because they can be prepared by suitable transformations in rings A and B from the $\Delta^5$-unsaturated tetrahydrosapogenins. Methods for transforming $\Delta^5$-unsaturated steroids into other steroids having functional groups such as double bonds, ketone groups, hydroxyl groups and the like have been developed during the past decade and these methods can now be applied to obtain a wide variety of tetrahydrosapogenins having the allo configuration at $C_5$. Some such transformations have already been illustrated and others are set forth in greater detail in the examples to follow.

To prepare the new $\Delta^5$-unsaturated tetrahydrosapogenins I treat $\Delta^5$-unsaturated steroidal sapogenins in an organic solvent with the combination of a mineral acid and zinc. I find that for best results one must make a careful choice of mineral acid and organic solvent used. I find especially that the use of a homogeneous solution is desirable, for if two phases are present during the reduction the yields are considerably diminished. For best results I prefer to use amalgamated zinc and a solution containing from one to five parts of concentrated hydrochloric acid per ten parts of organic solvent, and as organic solvent I prefer to use a lower aliphatic alcohol such as methanol, ethyl alcohol or one of the two isomeric propanols.

My invention may be further illustrated by the following examples:

Example 1

To 150 g. of amalgamated zinc is added a solution of 5 g. of diosgenin in 500 cc. of ethanol. This is brought to a reflux and a total of 150 cc. of concentrated hydrochloric acid is added over a period of two and one-half hours. Refluxing is continued for an additional thirty minutes. Then the mixture is poured into water and extracted with ether. The ethereal solution is washed well with water, and then concentrated to a volume of about 20 cc., whereupon the product crystallizes. It is filtered and recrystallized from ethyl acetate in which it is quite insoluble. This substance, tetrahydrodiosgenin, has M. P. 178–179° C. It may be represented by the formula below:

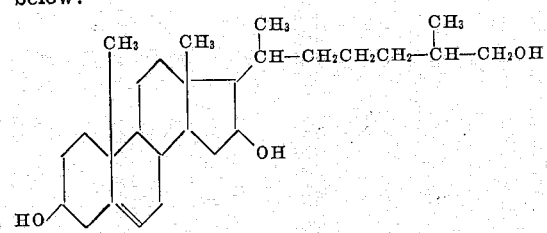

Treatment of the above tetrahydrodiosgenin with boiling acetic anhydride for fifteen minutes gives a triacetate, which, after crystallization from pentane has M. P. 119.5° C.

Tetrahydrodiosgenin triacetate (1.0 g.) is heated with a solution of 1 g. of potassium hydroxide in 100 cc. of ethanol for fifteen minutes on the steam bath. The solution is poured into water and extracted with ether. The ethereal solution is washed free of ethanol and the ether is removed. The crystalline residue is recrystallized from ethyl acetate, to give tetrahydrodiosgenin of M. P. 178–179° C.

Tetrahydrodiosgenin tribenzoate is prepared by adding benzoyl chloride to a solution of tetrahydrodiosgenin in pyridine. After standing overnight, the mixture is poured into water, the precipitate collected and crystallized from ether and from acetone. Tetrahydrodiosgenin tribenzoate as thus obtained has M. P. 166–167° C.

Example 2

A solution of 500 mg. of tetrahydrodiosgenin in 50 cc. of acetic acid is shaken with 200 mg. of platinum oxide catalyst under 3 atm. of hydrogen for two hours. The solution is filtered, the solvent removed in vacuo, and the residue crystallized from ether and from ethyl acetate. As thus obtained tetrahydrotigogenin has M. P. 195–197° C. It is very soluble in methanol and ethanol.

The triacetate of tetrahydrodiosgenin (100 mg.) is shaken in acetic acid (20 cc.) with 100 mg. of Adams catalyst under hydrogen at 3 atm. for one hour. The solution is filtered, poured into water and extracted with ether. The ether is evaporated to give an oil which crystallizes when treated with pentane and cooled in a carbon dioxide-ether bath. It is recrystallized from pentane to give tetrahydrotigogenin triacetate of M. P. 67–68° C.

Tetrahydrotigogenin (100 mg.) is acetylated directly by refluxing for fifteen minutes with an excess of acetic anhydride. The product crystallizes from pentane to give the triacetate of tetrahydrotigogenin, M. P. 66–67° C.

The triacetate of tetrahydrotigogenin (500 mg.) is dissolved in a solution of 2 g. of potassium hydroxide in 100 cc. of ethanol and heated on the steam bath for thirty minutes. The mixture is poured into water and extracted with ether. The ethereal solution is concentrated and crystallized to give tetrahydrotigogenin, M. P. 195–197° C.

The tribenzoate of tetrahydrotigogenin is prepared with benzoyl chloride and pyridine according to the directions of Example 1. The product crystallizes from ether and is the tribenzoate of tetrahydrotigogenin. This tribenzoate has M. P. 162° C.

Example 3

(a) To a solution of 4.0 g. of the triacetate of tetrahydrodiosgenin in 25 cc. of benzene is added a hot solution of 2.0 g. of selenious acid in 75 cc. of 97 per cent acetic acid, and the mixture refluxed vigorously for one hour. Then 5 g. of potassium acetate is added and the mixture is refluxed an additional ten minutes. Then the mixture is poured into water and the product is taken up in ether. The ethereal solution is washed free of acetic acid, the ether is removed and the residue is hydrolyzed with alcoholic potassium hydroxide. The solution is poured into water and extracted with ether. The ethereal solution is washed with water, evaporated, and the residue crystallized from acetone using norite. The product, tetrahydro-4-hydroxydiosgenin, has M. P. 196° C. It may be represented by the following formula:

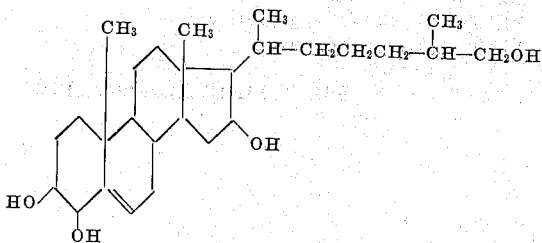

The mother liquors can be evaporated to give a small amount of the substance representable by the formula:

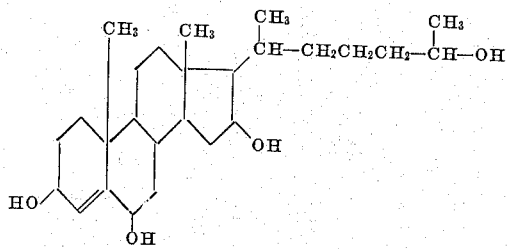

(b) A mixture of 1 g. of tetrahydro-4-hydroxydiosgenin, 0.1 g. of platinum oxide catalyst and 100 cc. of acetic acid is shaken under hydrogen at three atmospheres' pressure for an hour. Then the mixture is filtered and the filtrate concentrated in vacuo. The residue may be crystallized from methanol to give tetrahydro-4-hydroxytigogenin as white crystals.

Example 4

(a) Tetrahydro-4-hydroxydiosgenin (1.0 g.) is dissolved in 100 cc. of ethanol containing 5 cc. of concentrated hydrochloric acid. The solution is refluxed for ten minutes, then poured into water and extracted with ether. The ethereal solution is washed, evaporated, and the residue crystallized from ethyl acetate. The product, tetrahydro-$\Delta^4$-tigogenenone, has M. P. 163-4° C. and may be represented by the following formula:

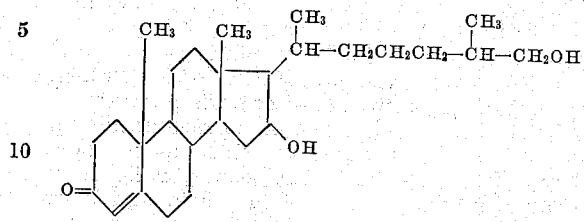

Example 5

(a) α-Diosgenyl chloride is prepared by treating diosgenin in carbon tetrachloride solution in the presence of calcium carbonate with a solution of phosphorous pentachloride in carbon disulfide. After re-crystallization from acetone the α-diosgenyl chloride has M. P. 211–213° C.

(b) α-Diosgenyl chloride is treated by the method of Example 1 with amalgamated zinc and alcoholic hydrochloric acid, thereby obtaining tetrahydro-α-diosgenyl chloride as white crystals somewhat soluble in acetone.

(c) The above tetrahydro-α-diosgenyl chloride may be catalytically hydrogenated by shaking it in acetic acid solution with one-tenth its weight of platinum oxide catalyst for two hours in a hydrogen atmosphere. Then the mixture is filtered and the filtrate concentrated in vacuo. The residue may be crystallized from methanol to give white crystals of tetrahydro-α-tigogenyl chloride.

The above examples illustrative of this invention are subject to numerous variations which, in view of this disclosure will be apparent to those skilled in the art.

$\Delta^5$-unsaturated sapogenins which may be treated with mineral acid and zinc to form $\Delta^5$-unsaturated tetrahydro-sapogenins include: diosgenin and its esters such as the acetate, the benzoate and the like; diosgenyl halides such as the chloride or the bromide; and 3-desoxydiosgenin. Furthermore the side chain of the $\Delta^5$-unsaturated steroidal sapogenins employed may be of either the sarsasapogenin or of the tigogenin type. Also instead of using the $\Delta^5$-unsaturated sapogenins the corresponding side chain halogenated derivatives of $\Delta^5$-unsaturated sapogenins having either the sarsasapogenin or the tigogenin type of side chain may be employed in the practice of this invention with results as satisfactory as those obtained with the parent unhalogenated sapogenins. Certain transformations of substituents which may be attached to $C_3$ may occur simultaneously with the reduction of the sapogenin side chain. For example, ester groups, such as an acetoxy group at $C_3$, may be saponified to hydroxyl groups. Nuclear halogen groups such as a chlorine atom at $C_3$ are usually unaffected during the reduction.

Other modes of isolating and purifying the tetrahydrosapogenins of this invention may be used instead of extraction with ether and crystallization as indicated in the examples. The method selected for isolation and purification of a particular tetrahydrosapogenin will be determined by its properties, but in general the methods will employ customary procedures in this art, such as partition between immiscible solvents, high vacuum distillation, chromatographic adsorption and like devices.

While I have described and illustrated certain forms of my invention and have set these forth in terms of a particular theory, I wish it to be understood that my invention is not to be limited to these forms, nor is its operability in any wise affected by the ultimate correctness of the particular theory herein employed.

What I claim as my invention is:

1. Process for the preparation of a steroidal sapogenin derivative which comprises treating a member of the class consisting of $\Delta^5$-unsaturated steroidal sapogenins and side chain halogenated $\Delta^5$-unsaturated steroidal sapogenins, while in an organic solvent with a mineral acid and zinc, under conditions more vigorous than those required merely to reduce a nuclear 3-keto group, thereby forming a tetrahydrosapogenin compound.

2. Process according to claim 1 in which the mineral acid is a member of the class consisting of hydrochloric acid and hydrobromic acid.

3. Process according to claim 1 wherein the organic solvent is a lower aliphatic alcohol.

4. Process according to claim 1 wherein the zinc has previously been amalgamated.

5. Process for the preparation of a steroidal sapogenin derivative which comprises treating a member of the class consisting of $\Delta^5$-unsaturated steroidal sapogenins and side chain halogenated steroidal sapogenins, while in a lower aliphatic alcohol solvent with hydrochloric acid and amalgamated zinc, under conditions more vigorous than those required merely to reduce a nuclear 3-keto group, thereby forming a tetrahydrosapogenin compound.

6. Process for the preparation of tetrahydrodiosgenin which comprises treating diosgenin while in an organic solvent with a mineral acid and zinc, under conditions more vigorous than those required merely to reduce a nuclear 3-keto group.

7. Process according to claim 6 in which the mineral acid is a member of the class consisting of hydrochloric acid and hydrobromic acid.

8. Process according to claim 6 wherein the organic solvent is a lower aliphatic alcohol.

9. Process according to claim 6 wherein the zinc has previously been amalgamated.

10. Process for the preparation of tetrahydrodiosgenin which comprises treating diosgenin, while in a lower aliphatic alcohol solvent with hydrochloric acid and amalgamated zinc, under conditions more vigorous than those required merely to reduce a nuclear 3-keto group.

11. A tetrahydrosapogenin compound selected from the class consisting of tetrahydrosapogenins having the cholestane configuration at $C_5$, tetrahydrosapogenin derivatives hydrolyzable to tetrahydrosapogenins having the cholestane configuration at $C_5$, tetrahydrosapogenins having a double bond between $C_5$ and one of $C_4$ and $C_6$, and tetrahydrosapogenin derivatives hydrolyzable to tetrahydrosapogenins having a double bond between $C_5$ and one of $C_4$ and $C_6$; said tetrahydrosapogenin compounds bearing in rings A and B together not more than three functional groups selected from the class consisting of hydroxyl groups, groups hydrolyzable to hydroxyl groups, ketone groups and groups hydrolyzable to ketone groups.

12. A tetrahydrosapogenin compound having the cholestane configuration at $C_5$ and substituted in rings A and B together by not more than three hydroxyl groups.

13. Tetrahydrodiosgenin.

14. Tetrahydro-$\Delta^4$-tigogenenone.

15. Tetrahydrotigogenin.

RUSSELL EARL MARKER.